United States Patent

[11] 3,542,460

[72] Inventors Roland L. Smith;
Esther T. Smith, Rte. 1, York, South Carolina 29745
[21] Appl. No. 672,119
[22] Filed Oct. 2, 1967
[45] Patented Nov. 24, 1970

[54] OPTHALMIC MOUNTING WITH REMOVABLE LENSES
3 Claims, 4 Drawing Figs.

[52] U.S. Cl. ..................................................... 351/92,
351/52, 351/106
[51] Int. Cl. ..................................................... G02c 1/04,
G02c 5/10
[50] Field of Search ........................................... 351/52, 61,
85, 92, 103, 154, 83, 90, 91, 95—98, 105—108,
110, 125, 140, 147, 149—150, 41

[56] References Cited
UNITED STATES PATENTS
2,594,395 4/1952 Castelli ........................ 351/91
3,017,806 1/1962 Stolper ........................ 351/106

FOREIGN PATENTS
914,794 10/1946 France ........................ 351/103
452,286 1949 Italy ............................ 351/103
747,422 1956 Great Britain ............... 351/106

Primary Examiner—David Schonberg
Assistant Examiner—John W. Leonard
Attorney—Channing L. Richards, Dalbert U. Shefte and Francis M. Pinckney ABSTRACT: An opthalmic mounting which supports a pair of lenses that can be readily removed and replaced comprising a support element having a center portion and resilient projecting arm portions that carry the lenses and that can be flexed outwardly to receive a detachable lens retaining member which is anchored at the center portion of the support and extends between the projecting ends of the arm portions, the retaining member being held in place by an interlocking connection which holds it in place until the arm portions are flexed to release it. Preferably, the retaining member has a lengthwise extent which is slightly greater than the normal spacing of the end parts so as to maintain the arm portions in a slightly flexed condition when the retaining member is in place.

Patented Nov. 24, 1970

3,542,460

INVENTORS
ROLAND L. SMITH &
ESTHER T. SMITH
BY
Channing L. Richards &
Dalbert U. Shefte
ATTORNEYS

OPTHALMIC MOUNTING WITH REMOVABLE LENSES

BACKGROUND OF THE INVENTION

Opthalmic mountings ordinarily consist of a nylon plastic material or the like formed into a unitary structure having endless rims which are expanded by heating to permit insertion of optical lenses therein and then allowed to cool and shrink back to their original size thereby locking the lenses securely in place. While this method of inserting lenses into opthalmic mountings is a relatively simple operation for a trained technician having the proper equipment, it is not an operation which can be performed by an ordinary wearer of optical glasses and, as a result, these lenses are only replaced when they become broken or when new lenses are prescribed.

However, there are many advantages in providing opthalmic mountings constructed to permit ready removal or replacement of the lenses by the wearer. For example, women often prefer to have several mountings of different colors and designs which complement a variety of their wardrobe ensembles, and the expense of having several different mountings is substantially reduced when only one pair of lenses can be used interchangeably in any of the mountings. By the same token, ready replacement of ordinary lenses with tinted lenses permits one mounting to be used as ordinary optical glasses or as sunglasses.

The prior art, therefore, discloses a number of opthalmic mountings constructed to permit disassembly and reassembly thereof by the wearer; however, so far as we are aware, none of these prior disclosures have met with wide scale acceptance. This lack of acceptance may be attributable to the fact that these prior disclosures often involve constructions which are too complex for the ordinary wearer, often requiring special tools for the assembly and disassembly operations; or they include metal attachment pieces or the like which must be fitted to the basic plastic mounting thereby increasing substantially the manufacturing costs; or they may be constructed in such a manner as to have an appearance which is bulky or otherwise unattractive.

SUMMARY OF THE INVENTION

The opthalmic mounting of the present invention, on the other hand, is extremely simple in construction and method of assembly and disassembly; it does not require any special tools or talent; and it has an attractive appearance substantially identical to opthalmic mountings made as a unitary structure.

More specifically, this opthalmic mounting has simple, two-piece construction including a support element having a center portion and two resilient, projecting arm portions which form U-shaped openings arranged to receive and seat a pair of optical lenses. These lenses are securely held in place by a detachable lens retaining member that is anchored at the center portion of the support element and extends between the projecting end parts of the arm portions so as to bridge the U-shaped openings. To permit quick and easy detachment of the retaining member, the adjacent surface portions of the projecting end parts and the retaining member, respectively, are formed with interlocking parts that will hold the retaining member in place until the resilient arm portions of the support element are flexed outwardly to release it.

Thus, the opthalmic mounting of the present invention utilizes the inherent resiliency of the projecting arm portions to hold the retaining member securely in place by interlocked parts that can be molded or otherwise formed as an integral part of the support element and retaining member, respectively, without requiring the addition of metal clamps or complex attaching arrangements, and without requiring any special tools to assemble or disassemble the mounting.

In the preferred embodiment of the present invention, the retaining member has a lengthwise extent which slightly exceeds the normal spacing of the projecting end parts when the arm portions are in their unflexed condition whereby when the retaining member is locked in place the arm portions will be slightly flexed so as to increase the holding purchase on the retaining member. The arm portions, of course, have sufficient resiliency to permit further flexing thereof to separate the projecting parts and release the retaining member.

DESCRIPTION OF THE PREFERRED EMBODIMENT

Figure 3:
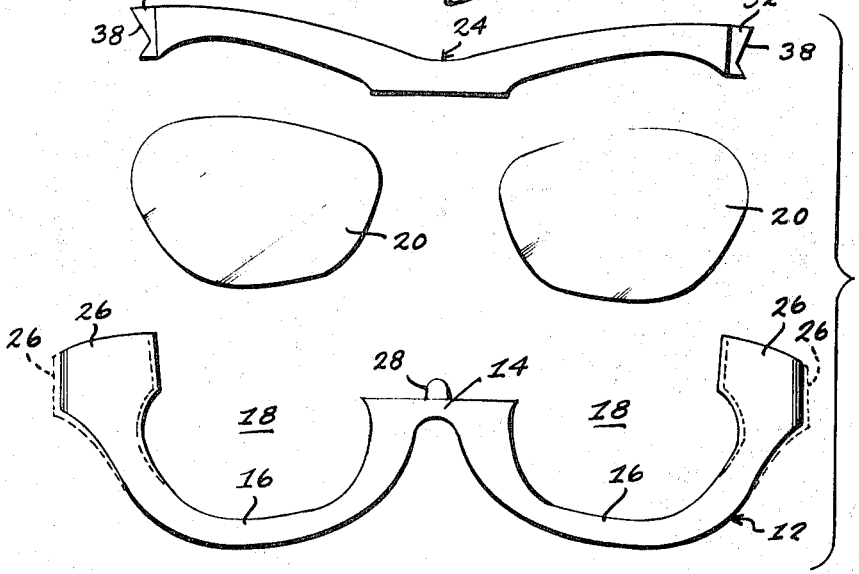
FIG. 3 is an exploded front view of the opthalmic mounting illustrated in FIG. 1.

The opthalmic mounting of the present invention, indicated generally by reference numeral 10, includes (as best seen in FIG. 3) a support element 12 comprising a center portion 14 from which arm portions 16 project in opposite directions to form U-shaped openings 18 shaped to receive a pair of optical lenses 20 therein, the openings 18 being surrounded by grooves 22 provided in the arm portion 16 in a conventional fashion to seat the lenses 20 thereat. The support element 12 may be manufactured from any of the well-known nonmetal materials used for opthalmic mountings (e.g., acetate plastic, or a plasticized vinyl resin polymer), the only requirement being that the particular material selected have flexibility characteristics which will provide the arm portions with sufficient resiliency to permit limited flexure thereof as will be explained in further detail presently.

To hold the lenses 20 securely in place after they are seated in grooves 22 about openings 18, a detachable lens-retaining member 24 is provided which is shaped to be anchored at the center portion 14 of the support element 12 and to extend between the projecting end parts 26 of the support element so as to bridge the U-shaped openings 18 whereby the lenses 20 are completely encased (FIG. 1) as in conventional mountings of unitary construction.

The retaining member 24 is anchored at the center portion 14 by a pin element 28 which fits into a corresponding slot 30 formed at the center of the retaining member 24, it being understood that the pin element 28 and slot 30 could be reversed if desired, and the retaining member 24 is held in place by interlocking parts comprising a flange 32 formed at each end face of retaining member 24 and a cooperating slot 34 provided at the adjacent face 36 of each projecting end part 26 to receive the flanges 32. The outermost faces of the flanges 32 present a concave surface configuration 38, and the innermost walls of slots 34 have a convex configuration 40 which nests with surface configuration 38 to provide a nice fit thereat. Also, the retaining member 24 is provided with shallow grooves 42, similar to grooves 22 around openings 18, into which the top surface of lenses 20 fit when retaining member 24 is in place.

Figure 1:
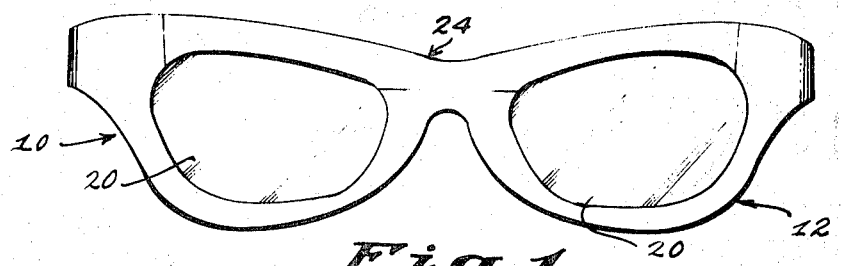
FIG. 1 is a front view of the opthalmic mounting of the present invention illustrated in its assembled position.
Figure 2:
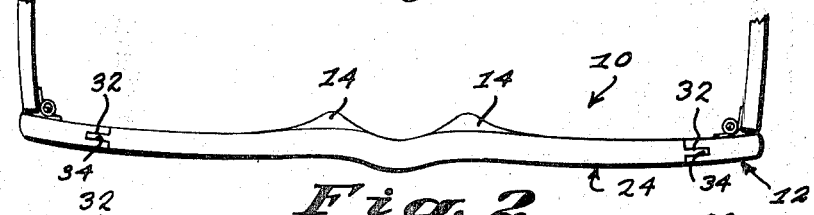
FIG. 2 is a plan view of the opthalmic mounting illustrated in FIG. 1.
Figure 4:
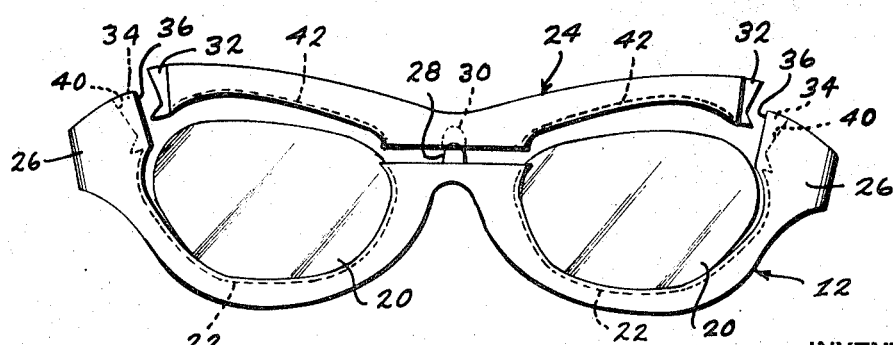
FIG. 4 is a front view corresponding generally to FIG. 1 but showing the projecting arm portions flexed to receive or release the retaining member.

With the thus described parts arranged in their assembled position as shown in FIG. 1, the lenses 20 may be quickly and easily removed by the wearer by simply flexing the arm portions 16 in a direction to increase the spacing between end parts 26 whereby the interlocked flanges 32 and slots 34 become separated as shown in FIG. 4, and the retaining member 24 is released for detachment. The lenses 20 may then be removed by lifting them from U-shaped openings 18, it being noted that in the preferred embodiment of the present invention the mouth of the U-shaped openings 18 has a width which substantially corresponds with the maximum width of the lenses 20 to facilitate extraction and insertion thereof.

To place lenses in an empty mounting 10, the reverse procedure is followed. The lenses 20 are first placed in the U-shaped openings 18 and the retaining member 24 is placed over pin element 28 and the arm portions 18 are flexed outwardly to receive the retaining member 24 with the flanges 32 alined with slots 34 whereupon the flexed arm portions 16 are permitted to snap against end faces of retaining member 24 and hold it securely in place.

This hold on the retaining member 24 is increased according to the present invention by providing retaining member 24 with a lengthwise extent that is slightly greater than the spacing of end parts 26 when arm portions 16 are in an unflexed condition, so that when the retaining member is snapped into place as described above, the arm portions 16 will be held in a slightly flexed condition tending to contract the spacing of the end parts 26 and thereby increase the purchase on retaining member 24. Thus, as seen in FIG. 3, the spacing of end parts 26 when arm portions are in an unflexed condition (full lines) is slightly less than the corresponding spacing when the retaining member 24 is in place (phantom lines). In this regard, it should also be pointed out that the clamping force of the arm portions 16 on the retaining member 24 should not be great enough to cause bowing of the retaining member 24, and, in some cases, it may be preferable to fabricate the retaining member 24 with somewhat greater stiffness than the support element 12.

The tight fit of the retaining member 24 and the support element 12 provide a nice appearance for the mounting 10, the only evidence of the separability of the components being the barely visible fine lines where the components meet.

This invention has been described in detail above for purposes of illustration only and is not intended to be limited by this description or otherwise except as defined in the appended claims.

We claim:

1. An opthalmic mounting for supporting a pair of lenses which can be selectively removed therefrom, said mounting comprising a support element having a center portion and oppositely projecting arm portions forming generally U-shaped openings having a width at the mouth thereof which substantially corresponds to the maximum width of said lenses for receiving the same, said oppositely projecting arm portions having sufficient resiliency to permit limited flexure thereof in a direction which increases the normal spacing between the respective projecting end parts thereof, a detachable lens-retaining member anchored at said center portion and extending between said projecting end parts to bridge said U-shaped openings, said retaining member having a lengthwise extent slightly greater than said normal spacing between said projecting end parts whereby said projecting arm portions will be maintained in a slightly flexed condition when said retaining member is in place therebetween, and interlocking means formed at the adjacent faces of said retaining member and said projecting end parts for holding said retaining member in place until said arm portions are flexed to increase the spacing of said projecting end parts and release said retaining member.

2. An opthalmic mounting as defined in claim 1 and further characterized in that said interlocking means comprises a flange projecting from each end of said retaining member and presenting a concave surface configuration at the projecting end thereof, and a slot formed in each of said projecting end parts to receive said flanges, the innermost wall of said slots having a convex configuration which nests with the concave configuration of said flanges.

3. An opthalmic mounting as defined in claim 1 and further characterized in that said retaining member is provided with a centrally located slot, and in that said center portion of said support element is formed with a projecting pin cooperating with said slot to anchor said retaining member at said center portion of the support element.